(12) United States Patent
Eguchi et al.

(10) Patent No.: US 10,605,636 B2
(45) Date of Patent: Mar. 31, 2020

(54) FLOWMETER

(71) Applicant: CKD CORPORATION, Komaki-shi, Aichi (JP)

(72) Inventors: Ryo Eguchi, Ichinomiya (JP); Naotsugu Seko, Nagoya (JP); Kazutoshi Ito, Kani (JP)

(73) Assignee: CKD CORPORATION, Komaki-shi (JP)

( * ) Notice: Subject to any disclaimer, the term of this patent is extended or adjusted under 35 U.S.C. 154(b) by 0 days.

(21) Appl. No.: 16/307,030

(22) PCT Filed: Jun. 13, 2018

(86) PCT No.: PCT/JP2018/022586
§ 371 (c)(1),
(2) Date: Dec. 4, 2018

(87) PCT Pub. No.: WO2019/031056
PCT Pub. Date: Feb. 14, 2019

(65) Prior Publication Data
US 2019/0277675 A1    Sep. 12, 2019

(30) Foreign Application Priority Data
Aug. 9, 2017    (JP) .................. 2017-154415

(51) Int. Cl.
*G01F 1/42* (2006.01)
*G01F 1/00* (2006.01)
*G01F 1/68* (2006.01)
*G01F 15/10* (2006.01)

(52) U.S. Cl.
CPC .................. *G01F 1/42* (2013.01); *G01F 1/00* (2013.01); *G01F 1/68* (2013.01); *G01F 15/10* (2013.01)

(58) Field of Classification Search
CPC ..... G01F 1/42; G01F 1/00; G01F 1/68; G01F 15/10
See application file for complete search history.

(56) References Cited

U.S. PATENT DOCUMENTS

| | | | | |
|---|---|---|---|---|
| 6,640,650 B2 * | 11/2003 | Matsuzawa | ............... | G01F 1/38 73/716 |
| 6,827,374 B2 * | 12/2004 | Gendrin | .................. | F16L 41/03 285/126.1 |
| 7,472,608 B2 * | 1/2009 | Hedtke | ............... | G01L 19/0007 73/861.63 |

(Continued)

FOREIGN PATENT DOCUMENTS

| | | |
|---|---|---|
| JP | 5160809 B2 | 3/2013 |
| JP | 5580140 B2 | 8/2014 |

*Primary Examiner* — Jewel V Dowtin
(74) *Attorney, Agent, or Firm* — Oliff PLC

(57) ABSTRACT

A flowmeter including a sensor passage disposed with a sensor chip for measuring a flow rate and an orifice passage as a bypass passage placed with respect to the sensor passage is provided. The orifice passage has a passage diameter which is smaller than a passage diameter of an inflow passage, a distribution orifice is placed on an inlet side of the sensor passage, and the orifice passage and the distribution orifice are configured such that changing trends in an effective sectional area becomes same in a graph including a vertical axis indicating the effective sectional area and a lateral axis indicating a fluid pressure of a fluid.

16 Claims, 4 Drawing Sheets

(56) References Cited

U.S. PATENT DOCUMENTS

| | | | |
|---|---|---|---|
| 2011/0167927 A1* | 7/2011 | Healey | F03B 13/00 73/861.353 |
| 2015/0276449 A1* | 10/2015 | Ito | G01F 1/78 73/861.351 |
| 2016/0001239 A1* | 1/2016 | Dille | G05D 7/0635 73/861.353 |

* cited by examiner

FLOWMETER

CROSS-REFERENCE TO RELATED APPLICATIONS

This is a US national phase application based on the PCT International Patent Application No. PCT/JP2018/022586 filed on Jun. 13, 2018, and claiming the priority of Japanese Patent Application No. 2017-154415 filed on Aug. 9, 2017, the entire contents of which are herewith incorporated by reference.

TECHNICAL FIELD

The present invention relates to a flowmeter including a sensor passage disposed with a sensor for measuring a flow rate and a bypass passage placed with respect to the sensor passage.

BACKGROUND ART

For example, Patent Document 1 and Patent Document 2 disclose a flowmeter provided with a sensor passage connected to an inflow passage and an outflow passage and a bypass passage placed with respect to the sensor passage. A to-be-measured fluid flows in the inflow passage, and then the fluid is divided into the one flowing in the sensor passage and the other one flowing in the bypass passage. The to-be-measured fluid having flown in the inflow passage partly flows in the sensor passage at a flow rate at which a sensor-side resistance (a differential pressure between an upstream-side pressure and a downstream-side pressure) generated in the sensor passage and a bypass-side resistance (a differential pressure between an upstream-side pressure and a downstream-side pressure) generated in the bypass passage are balanced. The to-be-measured fluid having flown out of the sensor passage and the fluid having flown out of the bypass passage are merged in the outflow passage and flown out of the flowmeter. The flowmeter measures the flow rate of the to-be-measured fluid flowing through the sensor passage by use of the sensor disposed therein, converts the measured flow rate into an entire flow rate of the to-be-measured fluid flowing through the flowmeter by a ratio (a distribution ratio) of the sensor-side resistance to the bypass-side resistance, and then outputs a signal.

RELATED ART DOCUMENTS

Patent Documents

Patent Document 1: JP5580140B
Patent Document 2: JP5160809B

SUMMARY OF INVENTION

Problems to be Solved by the Invention

However, the conventional flowmeter has the following problem. Even if a mass flow rate of the to-be-measured fluid flowing in a flowmeter is same, the conventional flowmeter may cause deviation in the sensor output between a case of the to-be-measured fluid being in the positive pressure and a case of the to-be-measured fluid being in the negative pressure as shown in FIG. 7. The present inventors have found this problem when they used one flowmeter, which has been used for flowrate control of a fluid under the positive pressure, to control a fluid under the negative pressure. The present inventors have studied reasons of this problem and concluded that this problem is caused by changes in the distribution ratio changing according to fluid pressure.

Specifically, when the mass flow rate is the same, the negative fluid has lower molecular density than the positive fluid and thus easily flows in the sensor passage. Accordingly, the flow rate of the negative fluid detected by the sensor is more than that of the positive fluid. In other words, the sensor-side resistance and the bypass side resistance lose their balance due to the fluid pressure, causing changes in the distribution ratio. The conventional flowmeter calculates the entire flow rate from a predetermined distribution ratio and the flow rate that is actually detected by the sensor. A gap is therefore generated in the sensor output between the positive fluid and the negative fluid even if the mass flow rate of the to-be-measured fluid supplied to the flowmeter is the same. This gap has been allowable to some extent, but recently, a demand for further accuracy in a flowmeter is growing.

The present invention has been made in view of the circumstances to solve the above problem and has a purpose of providing a flowmeter preventing degradation of accuracy in sensor output from being degraded due to changes in fluid pressure of a to-be-measured fluid.

Means of Solving the Problems

To achieve the above purpose, one aspect of the invention provides (1) a flowmeter comprising a sensor passage disposed with a sensor for measuring a flow rate and a bypass passage placed with respect to the sensor passage, wherein the flowmeter includes a distribution orifice provided on an inlet side of the sensor passage and a main orifice provided in the bypass passage, and in a graph including a vertical axis indicating an effective sectional area and a lateral axis indicating a fluid pressure of a fluid, a changing trend in the effective sectional area of the main orifice and a changing trend in the effective sectional area of the distribution orifice are similar.

The above-mentioned flowmeter is configured such that the effective sectional area of the main orifice and the effective sectional area of the distribution orifice are changed according to the changes in the fluid pressure. Herein, the effective sectional area of the distribution orifice and the effective sectional area of the main orifice change in similar trends. Accordingly, even if the fluid pressure changes, a flow rate of a fluid flowing in the distribution orifice and a flow rate of a fluid flowing in the main orifice have less changes in their distribution ratio. This can prevent deviation in the sensor output caused by the variation in the fluid pressure even when the entire flow rate is calculated based on the predetermined distribution ratio and the flow rate detected by the sensor. The above-mentioned flowmeter can thus prevent degradation in the accuracy in the sensor output that is caused by changes in the fluid pressure.

(2) In the flowmeter mentioned in the above (1), preferably, in the graph including the vertical axis indicating the effective sectional area and the lateral axis indicating the fluid pressure of the fluid, the effective sectional area of the distribution orifice decreases to the left in a region where the fluid pressure is negative, and in the graph including the vertical axis indicating the effective sectional area and the lateral axis indicating the fluid pressure of the fluid, the effective sectional area of the main orifice decreases to the left in the region where the fluid pressure is negative.

In the region where the fluid pressure is negative, the distribution orifice has different changing trends in the effective sectional area according to a size and the number of orifice holes. The main orifice also has different changing trends in the effective sectional area according to a length of the small-diameter part or the like. The flowmeter is accordingly arranged with a combination of the main orifice and the distribution orifice both having the similar changing trends in the effective sectional area as decreasing to the left in the region where the fluid pressure is negative. This arrangement can effectively restrains changes in a distribution ratio even when the fluid pressure varies in the negative-pressure region.

(3) In the flowmeter described in the above (1) or (2), preferably, the main orifice in a nozzle-like shape has a length in a pipe-axis direction twice or more as long as a passage diameter in a direction orthogonal to a pipe axis, and the distribution orifice has a plurality of through holes.

The fluid has the larger pipe friction resistance in a case of flowing through the nozzle-shaped main orifice than in a case of flowing through the thin plate-like orifice formed with circular holes. The nozzle-shaped main orifice has larger pressure loss than the plate-like orifice. On the other hand, a total contact area of the fluid being in contact with an inner wall of a hole becomes larger in a case of providing a plurality of holes in the distribution orifice than in a case of providing a single hole under the condition that the distribution orifice has the same opening area. Accordingly, forming a plurality of holes in the distribution orifice has larger pressure loss than forming the single hole. The flowmeter having the nozzle-shaped main orifice thus employs a distribution orifice having a plurality of through holes to similarize the changing trends in the effective sectional areas of the main orifice and the distribution orifice.

In the flowmeter according to any one of the above (1) to (3), preferably, the effective sectional area is calculated by a formula of a subsonic region.

The formula for calculating the effective sectional area in the subsonic region seems not to function enough in the negative pressure region. However, some trends can be known from the formula, and the present invention has been made to utilize such a qualitative trend. To be specific, according to the above-mentioned flowmeter, the changing trends in the effective sectional areas of the distribution orifice and the main orifice can be easily obtained by the known formula of the subsonic region.

(5) In the flowmeter according to any one of the above (1) to (4), preferably, the main orifice has a small-diameter part having a length of 9 mm or more, and the distribution orifice is formed with any ones of nine holes each having a diameter of 0.2 mm when a fluid flows at a small flow rate and seven holes each having a diameter of 0.15 mm when the fluid flows at a large flow rate.

In the above flowmeter, the distribution orifice for the small flow rate has larger opening area than the distribution orifice for the large flow rate, but the fluid is hard to flow in the distribution orifice for the small flow rate. A reason for this is unknown, but this flow rate characteristics has been obtained by experiments. Thus, the flowmeter can achieve accurate flow rate measurement from the small flow rate to the large flow rate by selecting any one of the distribution orifice for the small flow rate and the distribution orifice for the large flow rate.

Effects of the Invention

According to the present invention, therefore, there is provided a flowmeter that can prevent accuracy of a sensor output from degrading that is caused by changes in a fluid pressure.

MODE FOR CARRYING OUT THE INVENTION

A detailed description of an embodiment of a flowmeter embodying the present invention is now be given referring to the accompanying drawings.

(Schematic Configuration of Flowmeter)

Figure 1:
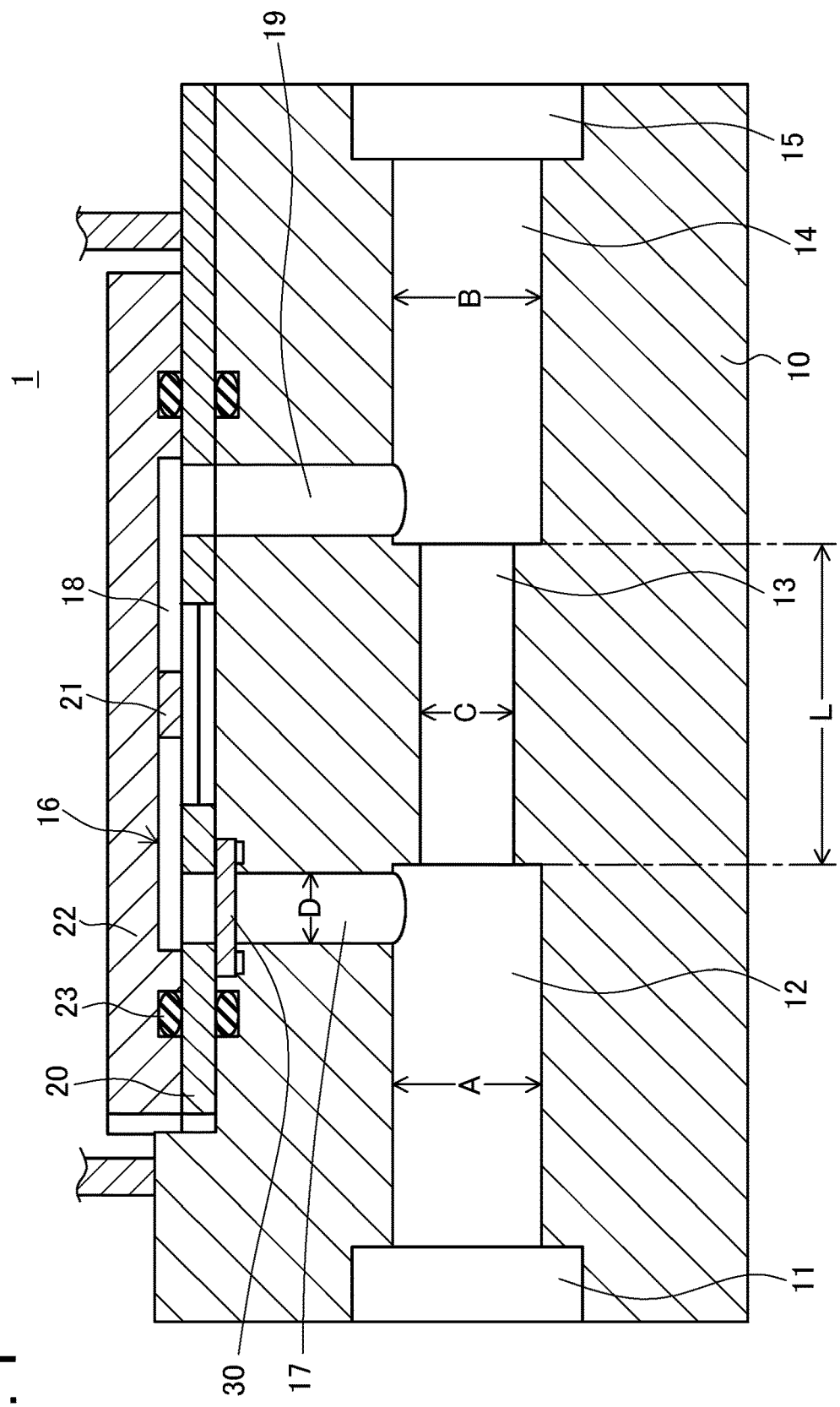
FIG. 1 is a passage sectional view of a flowmeter in an embodiment of the present invention.

FIG. 1 is a passage sectional view of a flowmeter 1. The flowmeter 1 is roughly configured with a body 10 and a sensor substrate 20. The sensor substrate 20 is placed on an upper surface of the body 10 via a sealing gasket 23 so that the substrate 20 closes a passage space 18 opening in the upper surface of the body 10, and the substrate 20 is in close contact with the body 10 by fixing a substrate retainer 22 to the body 10 by a screw.

Both end faces of the body 10 are formed with an input port 11 and an output port 15, respectively. The input port 11 is communicated with the output port 15 via an inflow passage 12, an orifice passage 13, an outflow passage 14, and a sensor passage 16.

The input port 11, the inflow passage 12, the orifice passage 13, the outflow passage 14, and the output port 15 are formed coaxially. The inflow passage 12 is formed in a bottomed cylindrical shape extending from the input port 11 to a center part of the body 10. The outflow passage 14 is formed in a bottomed cylindrical shape extending from the output port 15 to the center part of the body 10. The orifice passage 13 has a cylindrical shape in section in a direction orthogonal to a pipe axis.

A passage diameter A of the inflow passage 12 and a passage diameter B of the outflow passage 14 are the same length. A passage diameter C of the orifice passage 13 is smaller than the passage diameters A and B. The orifice passage 13 has a length L in a pipe axis direction twice or more as long as the passage diameter C. Herein, a passage from a downstream side of a part where the inflow passage 12 is connected to the sensor passage 16 to an upstream side of a part where the outflow passage 14 is connected to the sensor passage 16 is one example of the bypass passage. Further, the orifice passage 13 is one example of the main orifice and the small-diameter part of the main orifice.

The sensor passage 16 is provided with an upstream-side passage 17 vertically connected to the inflow passage 12, a downstream-side passage 19 vertically connected to the outflow passage 14, and the passage space 18 connecting the upstream-side passage 17 and the downstream-side passage 19. A sensor chip 21 is provided in the sensor substrate 20 and disposed in the passage space 18. The sensor chip 21 is one example of the sensor.

The upstream-side passage 17 and the downstream-side passage 19 are formed to have the same diameter. A passage diameter D of the upstream-side passage 17 is smaller than the passage diameter C of the orifice passage 13. A distribution orifice 30 is placed in the upstream-side passage 17. Namely, the distribution orifice 30 is placed on an upstream side of the sensor chip 21.

Figure 2:
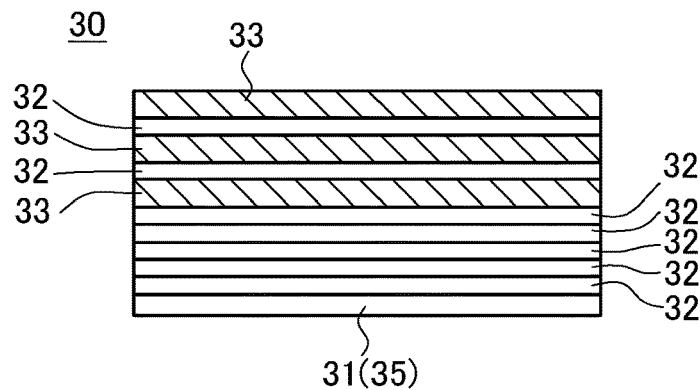
FIG. 2 is a diagram showing a laminating structure of a distribution orifice.

As shown in FIG. 2, the distribution orifice 30 is configured by laminating an orifice plate 31, spacers 32, and filter plates 33. Specifically, a plurality of the spacers 32 are placed between the orifice plate 31 and the filter plate 33 to assure a clearance for making a to-be-measured fluid (one example of a fluid) flow smoothly to the orifice plate 31. The filter plates 33 are alternately placed with the spacers 32. In the sensor passage 16, foreign matters got in the to-be-measured fluid are removed by the filter plates 33. The foreign matters can be thus prevented from getting stuck in a narrow space between an inner wall of the passage space 18 and the sensor chip 21.

Figure 3:
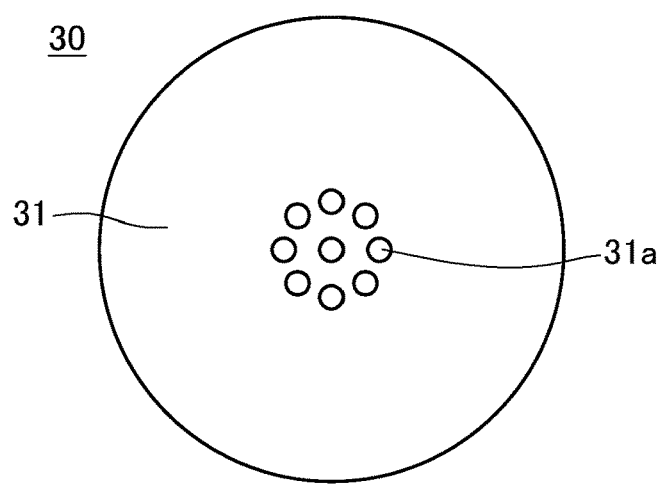
FIG. 3 is a plan view of through holes and their vicinity of the distribution orifice for a small flow rate.
Figure 4:
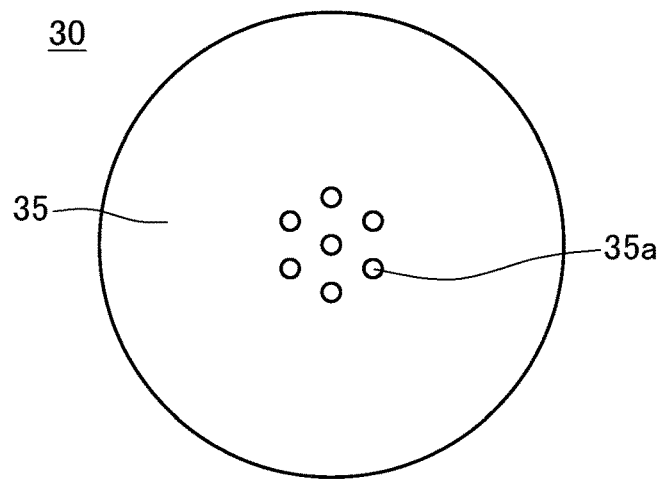
FIG. 4 is a plan view of through holes and their vicinity of the distribution orifice for a large flow rate.

The distribution orifice 30 is selected from any one of the orifice plate 31 for a small flow rate shown in FIG. 3 and an orifice plate 35 for a large flow rate shown in FIG. 4. The orifice plate 31 and the orifice plate 35 are formed with a plurality of holes 31a and a plurality of holes 35a centering about a pipe axis, respectively. The orifice plate 31 shown in FIG. 3 has nine holes 31a each having a diameter of 0.2 mm. The orifice plate 35 shown in FIG. 4 has seven holes 35a each having a diameter of 0.15 mm. Accordingly, the distribution orifice 30 has a larger opening area when using the orifice plate 31 for the small flow rate than using the orifice plate 35 for the large flow rate.

In the above flowmeter 1, the passage diameter C of the orifice passage 13 is smaller than the small diameter A of the inflow passage 12, and thus the pressure declines in the orifice passage 13. This leads to steady flow of a part of the to-be-measured fluid having flown to the inflow passage 12 to the sensor passage 16. The to-be-measured fluid flowing in the inflow passage 12 is thus divided into the one flowing in the distribution orifice 30 of the sensor passage 16 and the other one flowing in the orifice passage 13. At this time, the to-be-measured fluid flows in the sensor passage 16 at a flow rate at which a sensor-side resistance (a differential pressure between an upstream-side pressure and a downstream-side pressure of the distribution orifice 30) generated in the sensor passage 16 and a bypass-side resistance (a differential pressure between an upstream-side pressure and a downstream-side pressure of the orifice passage 13) generated in the orifice passage 13 are balanced. Subsequently, the to-be-measured fluid having been flowing in the sensor passage 16 and the to-be-measured fluid having been flowing in the orifice passage 13 are merged in the outflow passage 14 and discharged outside the flowmeter 1 via the output port 15.

The sensor substrate 20 measures the flow rate of the to-be-measured fluid flowing through the sensor passage 16 by the sensor chip 21. The sensor substrate 20 converts the flow rate of the to-be-measured fluid measured by the sensor chip 21 into the entire flow rate based on a predetermined distribution ratio. The sensor substrate 20 then outputs a signal in proportion to the thus calculated entire flow rate.

(Flow Rate Characteristics of Distribution Orifice and Main Orifice)

The present inventors have performed a first test for examining a relationship of a fluid pressure and the effective sectional area of the distribution orifice and a second test for examining a relationship of the fluid pressure and the effective sectional area of the main orifice. The first test and the second test are performed by use of a test device provided with a regulator, a pressure sensor, an MFC, an upstream-side pressure sensor, a to-be-tested flowmeter, a downstream-side pressure sensor, a variable aperture, and a vacuum pump in this order from an upstream side.

In the first test and the second test, air is employed as the to-be-measured fluid. Further, in the first test and the second test, the regulator adjusts a primary pressure of the air which is to be supplied to the MFC to 0.3 MPa. The flow rate of the air is thus regulated to a certain flow rate by the MFC. Subsequently, the variable aperture changes the upstream-side pressure and the downstream-side pressure of the to-be-tested flowmeter. The upstream-side pressure sensor then measures an upstream-side pressure P1 of the to-be-tested flowmeter, and the downstream-side pressure sensor measures a downstream-side pressure P2 of the to-be-tested flowmeter. A temperature T is set to be fixed. The effective sectional area is calculated inversely by a formula of a subsonic region indicated below as a formula 1 and a formula of a sonic region indicated below as a formula 2 by inserting the upstream-side pressure P1 and the downstream-side pressure P2. Herein, Q represents a flow late (L/min), P1 represents the upstream-side pressure (MPa), P2 represents the downstream-side pressure (MPa), T represents a temperature (K), and S represents the effective sectional area (mm$^2$). The formula of the subsonic region indicated in the following formula 1 is employed when (P2+0.1)/(P1+0.1) >0.5 is established. The formula of the sonic region indicated in the following formula 2 is employed when (P2+0.1)/(P1+0.1)<0.5 is established.

$$Q=\sqrt{240S(P2+0.1)(P1-P2)}\sqrt{293/T} \qquad \text{Formula 1}$$

$$Q=120S(P1+0.1)\sqrt{293/T} \qquad \text{Formula 2}$$

Herein, the formulas (the formula 1 and the formula 2) for calculating the effective sectional area in the subsonic region or in the sonic region seem not to function enough in the negative pressure region. However, some kinds of trends can be obtained by those formulas, and thus the effective sectional area is inversely calculated by the formula of the subsonic region indicated as the formula 1 and the formula of the sonic region indicated as the formula 2 in the first test and the second test to obtain the qualitative trends in the effective sectional area.

Figure 5:
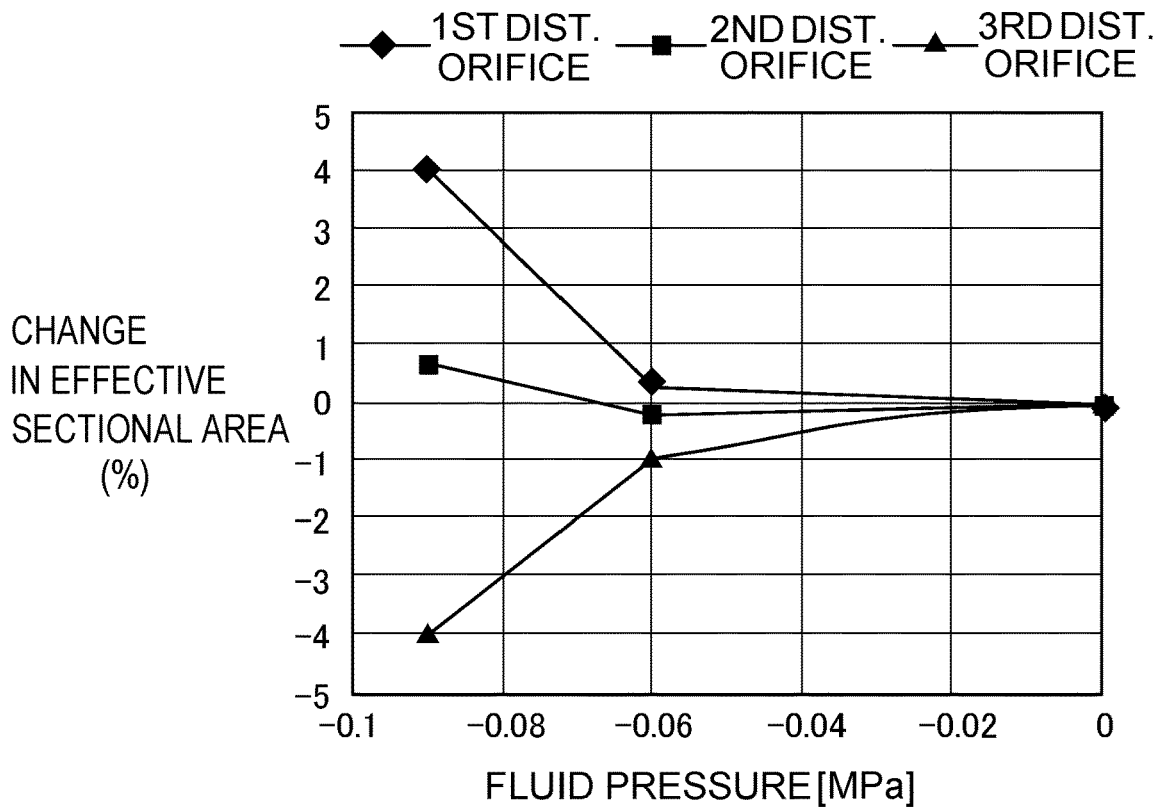
FIG. 5 is a graph showing flow rate characteristics of the distribution orifice.

In the first test, a first product subject to test, a second product subject to test, and a third product subject to test are employed as to-be-tested flowmeters which are in common structure except the configuration of the distribution orifice. The first product adopts a first distribution orifice formed with a single hole having a diameter of 0.4 mm. The second product adopts a second distribution orifice formed with a single hole having a diameter of 0.6 mm. The third product adopts a third distribution orifice formed with nine holes each having a diameter of 0.2 mm. Test results of the first test are shown in FIG. 5. A vertical axis in a graph of FIG. 5 indicates changes (%) in the effective sectional area and a lateral axis indicates a fluid pressure (MPa). The fluid pressure represents a fluid pressure (the upstream-side pressure P1) of air which is supplied to the first to third products. Changes in the effective sectional area represent a changing ratio of the effective sectional area relative to the effective sectional area of the distribution orifice that is calculated when the fluid pressure (the upstream-side pressure P1) is 0 MPa (atmospheric pressure).

The second distribution orifice and the third distribution orifice have the different number of holes, but they have the same opening area. However, as shown in FIG. 5, the second distribution orifice is growing to the left in its changing trend in the effective sectional area in a region where the fluid pressure is negative. On the other hand, the third distribution orifice is reducing to the left in its changing trend in the effective sectional area in the region where the fluid pressure is negative. This difference in the flow rate characteristics is considered to be caused by the reason that a plurality of holes have more wider area contacting the air than a single hole and thus the air becomes hard to flow with the plural holes.

The first distribution orifice and the second distribution orifice have the same number of holes as one. However, the second distribution orifice has the larger opening area than the first distribution orifice. Generally, the second distribution orifice is considered to have the larger effective sectional area than the first distribution orifice and thus the fluid flows easily. The result of the first test shown in FIG. 5 however indicates that the second distribution orifice has smaller increase ratio in the effective sectional area in the region where the fluid pressure is negative than the first distribution orifice. Specifically, the fluid is hard to flow through the second distribution orifice even though it has the larger opening area than the first distribution orifice.

From the results of the above first test, the present inventors have confirmed that the changing trends in the effective sectional area vary when the fluid pressure varies depending on the opening area of the distribution orifice and the number of holes.

Figure 6:
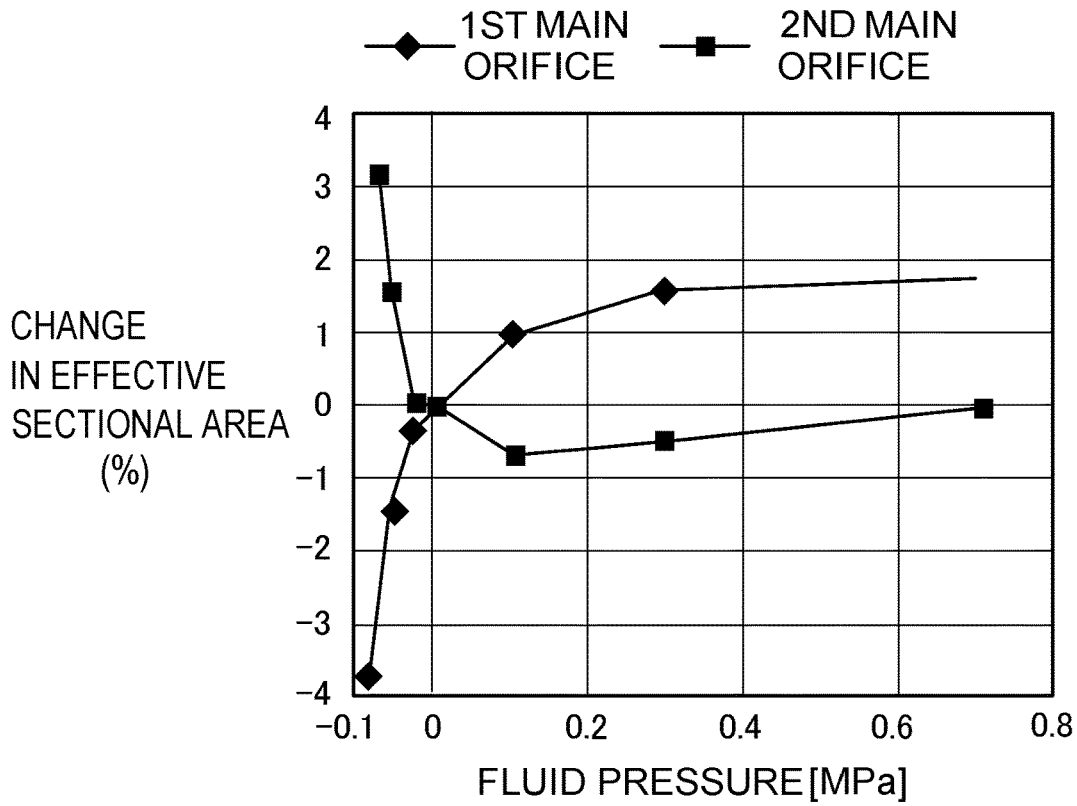
FIG. 6 is a graph showing flow rate characteristics of a main orifice.

The second test adopts a fourth product subject to test and a fifth product subject to test as the to-be-tested flowmeters which have the common structure except the configuration of the main orifice. The fourth product and the fifth product have the same passage diameter in the inflow passage 12, the orifice passage 13, and the outflow passage 14 and are each provided with the main orifice in the orifice passage 13. The fourth product adopts a first main orifice in a nozzle-like shape with a thickness (a length of a small-diameter part in a pipe axis direction) of 9.4 mm. The fifth product adopts a plate-like second main orifice having a thickness (a length of a small-diameter part in the pipe axis direction) of 1 mm. The first main orifice and the second main orifice have the same orifice diameter. Results of the second test are shown in FIG. 6. A vertical axis in a graph of FIG. 6 indicates changes (%) in the effective sectional area and a lateral axis indicates a fluid pressure (MPa). The fluid pressure represents a fluid pressure (the upstream-side pressure P1) of the air which is to be supplied to the fourth and fifth products. The changes in the effective sectional area represent the changing ratio relative to the effective sectional area of the main orifice that is calculated when the fluid pressure (the upstream-side pressure P1) is 0 MPa.

As shown in FIG. 6, the second main orifice is growing to the left in its changing trend in the effective sectional area in the region where the fluid pressure is negative. On the other hand, the first main orifice decreases to the left in its changing trend in the effective sectional area in the region where the fluid pressure is negative. This difference is considered to be caused by the reason that the longer the length of the small-diameter part of the main orifice is, the larger the pipe friction resistance generated between the fluid and the inner wall of the main orifice becomes, so that the fluid is hard to flow.

From the results of the above second test, the present inventors have confirmed that the changing trend in the effective sectional area differs when the fluid pressure varies depending on the length of the small-diameter part of the main orifice.

(Combination of Main Orifice and Distribution Orifice)

A relationship of the fluid pressure and the distribution ratio is now studied with a first comparative example employing a combination of the first main orifice and the second distribution orifice and a first example employing a combination of the first main orifice and the third distribution orifice.

In the first comparative example, the changing trend in the effective sectional area of the first main orifice is falling to the left in a region where the fluid pressure is negative while the changing trend in the effective sectional area of the second distribution orifice is growing to the left. Namely, the first main orifice and the second distribution orifice are reversed in their changing trends in the effective sectional area. Accordingly, in the first comparative example, the lower the fluid pressure decreases from 0 MPa, the smaller the effective sectional area of the first main orifice becomes, whereas the effective sectional area of the second distribution orifice increases.

As a result, when the fluid pressure turns negative from 0 MPa in the first comparative example, the air is hard to flow in the first main orifice but easy to flow in the second distribution orifice. Thus, in the first comparative example, the balance between the resistance on the second distribution orifice side and the resistance on the first main orifice side is largely collapsed between the fluid pressure at 0 MPa and the negative fluid pressure. Changes in the distribution ratio are large between the fluid pressure at 0 MPa and the negative fluid pressure in the first comparative example. Changes in the fluid pressure thereby cause variations in the entire flow rate that is calculated based on a predetermined distribution ratio and the flow rate measured by the sensor chip 21, resulting in large deviation in the sensor output.

To be more specific, assuming that the distribution ratio of the air flowing into the second distribution orifice and the air flowing into the first main orifice is one third to two thirds when the fluid pressure is 0 MPa, the ratio is changed to two fifths to three fifths in the region where the fluid pressure is negative, for example. This causes changes in the flow rate measured by the sensor chip 21 and generates deviation in the sensor output.

On the other hand, in the first example, the changing trends in the effective sectional area of the first main orifice and the changing trends in the effective sectional area of the third distribution orifice are both similarly falling to the left in the region where the fluid pressure is negative. Accordingly, when the fluid pressure decreases from 0 MPa in the first example, both the effective sectional area of the first main orifice and the effective sectional area of the third distribution orifice become small.

As a result, when the fluid pressure turns negative from 0 MPa in the first example, the air is hard to flow into both the first main orifice and the third distribution orifice. Accordingly, the balance between the resistance on the third distribution orifice side and the resistance on the first main orifice side is not largely collapsed in the first example in a case of the fluid pressure being 0 MPa and a case of the fluid pressure being negative. In other words, in the first example, the distribution ratio approximates in the case of the fluid pressure at 0 MPa and the case of the negative fluid pressure. The entire flow rate calculated based on the predetermined distribution ratio and the flow rate measured by the sensor chip 21 thus hardly varies due to the changes in the fluid pressure, resulting in less deviation in the sensor output.

The present inventors have measured the sensor output in the case of the fluid pressure at 0 MPa and the case of the fluid pressure at −0.07 MPa for the first comparative example and confirmed that an accuracy relative to a maximum full-scale flow rate is deviated by 12% (+12% F.S.). On the other hand, the present inventors have also measured the sensor output in the case of the fluid pressure at 0 MPa and the case of the fluid pressure at −0.07 MPa for the first example and confirmed that the accuracy relative to the maximum full-scale flow rate is deviated by 3.7% (+3.7% F.S.). The first example is thus confirmed to achieve reduction in the accuracy difference of the sensor output to about one third of the first comparative example.

The present inventors have further studied the differences in the sensor output in the case of the fluid pressure at 0 MPa and a case of a positive fluid pressure with the above first comparative example and the first example. As a result, the accuracy relative to the maximum full-scale flow rate is deviated by −6% (−6% F.S.) in the first comparative example. On the other hand, in the first example, the accuracy relative to the maximum full-scale flow rate is −2.1% (−2.1% F.S.). This shows that the first example can achieve reduction in the accuracy difference in the sensor output to about one third of the first comparative example also in a region where the fluid pressure is positive.

Therefore, both in the positive fluid pressure region and the negative fluid pressure region, the similar changing trends in the effective sectional area in the main orifice and the distribution orifice can reduce deviation in the accuracy of the sensor output according to the changes in the fluid pressure.

When the second main orifice is used, employment of the first distribution orifice similarizes the changing trends in the effective sectional area of the second main orifice and the first distribution orifice as rising to the left in the region where the fluid pressure is negative. In this case, as similar to the above, variation in the distribution ratio due to the changes in the fluid pressure can be made small, thereby preventing degradation in the accuracy of the sensor output. The second distribution orifice also has the changing trends in the effective sectional area rising to the left in the negative fluid pressure region. However, the first distribution orifice has more similar changing trend in the effective sectional area to the changing trend in the effective sectional area in the second main orifice than the second distribution orifice. Therefore, combination of the first distribution orifice with the second main orifice achieves approximation of the changing trends in the effective sectional area and further effectively prevents variation in the distribution ratio, thus preventing degradation in the accuracy of the sensor output.

The present embodiment has the feature that the flowmeter 1 is provided with, as well as the sensor passage 16 disposed with the sensor chip 21 for measuring the flow rate, the bypass passage (the inflow passage 12, the orifice passage 13, and the outflow passage 14) with respect to the sensor passage 16, the flowmeter 1 further includes the distribution orifice 30 provided on an inlet side of the sensor passage 16 and the orifice passage 13 (the main orifice) provided on the bypass passage, and in a graph including a vertical axis indicating the effective sectional area and a lateral axis indicating the fluid pressure of the fluid, the changing trends in the effective sectional area of the orifice passage 13 (the main orifice) and the changing trends in the effective sectional area of the distribution orifice 30 are similar to each other, thus preventing degradation in the accuracy of the sensor output due to changes in the fluid pressure.

Especially, the flowmeter 1 has the feature that the effective sectional area of the distribution orifice 30 falls to the left in the region where the fluid pressure is negative in a graph including the vertical axis indicating the effective sectional area and the lateral axis indicating the fluid pressure of the fluid and that the effective sectional area of the orifice passage 13 (the main orifice) falls to the left in the region where the fluid pressure is negative in the graph including the vertical axis indicating the effective sectional area and the lateral axis indicating the fluid pressure of the fluid. Therefore, the changes in the distribution ratio can be effectively restrained even if the fluid pressure varies in the negative pressure region.

Further, the flowmeter 1 calculates the effective sectional area by the formula of the subsonic region (the above formula 1) and the formula of the sonic region (the above formula 2). As mentioned above, the formulas for calculating the effective sectional area in the subsonic region and the sonic region seems not to function enough in the negative pressure region, but some trends can be grasped by those formulas. The present embodiment utilizes the thus obtained qualitative trend. Namely, according to the flowmeter 1 of the present embodiment, the changing trends in the effective sectional areas of the distribution orifice and the main orifice can be easily obtained by use of the known formula of the subsonic region.

Further, the flowmeter 1 is configured such that the orifice passage 13 has the length in the pipe axis direction (the length of the small diameter part of the main orifice) of 9 mm or more and that the distribution orifice 30 has the nine holes each having a diameter of 0.2 mm for the small flow rate or has the seven holes each having a diameter of 0.15 mm for the large flow rate. Accordingly, selecting any one of the distribution orifice for the small flow rate and the distribution orifice for the large flow rate depending on the flow rate of the to-be-measured fluid realizes accurate measurement from the small flow rate to the large flow rate.

Figure 7:
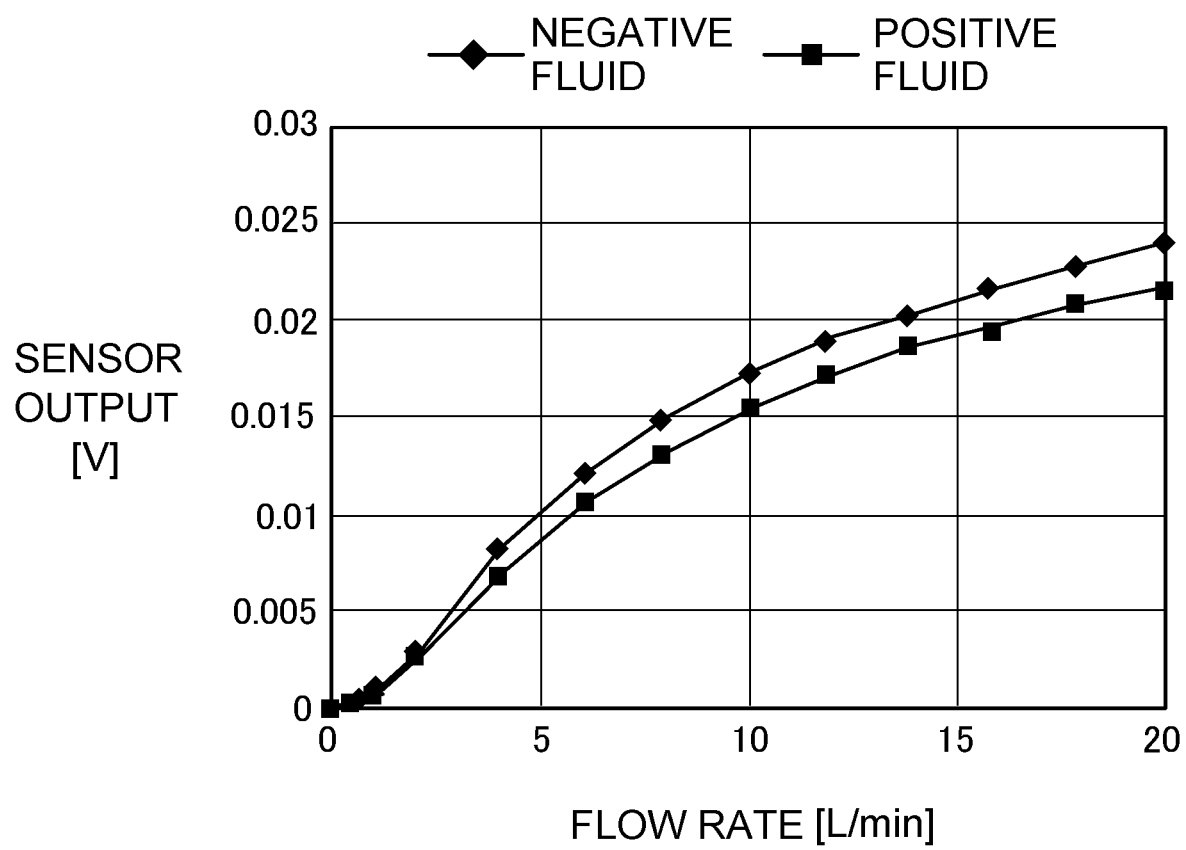
FIG. 7 is a graph showing one example of sensor output characteristics.

To be more specific, as shown in FIG. 7 for example, the larger the flow rate is, the more deviation is generated in the sensor output of the positive fluid and the negative fluid. This means that the distribution ratio varies not only depending on the fluid pressure but also depending on the flow rate. To address this, selecting any one of the orifice plate 31 for the small flow rate and an orifice plate 35 for the large flow rate depending on the flow rate as for the distribution orifice 30 can effectively restrain deviation in the sensor output.

The present embodiment is only an illustration and has no any limitation to the present invention. Therefore, the present invention may be applied with various changes and modifications without departing from the scope of its subject matter.

For example, the distribution orifice 30 may be placed not only on the inlet side (the upstream-side passage 17) of the sensor passage 16 but also on an outlet side (the downstream-side passage 19). This configuration can prevent degradation in the accuracy of the sensor output due to the changes in the fluid pressure when the fluid flows bidirectionally in the flowmeter 1.

For example, the passage diameter C of the orifice passage 13 may be the same length with the passage diameter A of the inflow passage 12, and a main orifice separately provided from the body 10 may be placed. In this example, the main orifice may be a plate-like orifice having a length L of a small diameter part in the pipe axis direction less than twice as long as the passage diameter in a direction orthogonal to the pipe axis direction or may be a nozzle-shaped orifice having the length L twice or more as long as the passage diameter.

For example, the distribution orifice 30 may be configured with any one of the orifice plate 31 for the small flow rate and the orifice plate 35 for the large flow rate, and the spacer 32 and the filter plate 33 may be omitted.

For example, the distribution orifice 30 may be in a plan rectangular shape other than the circular shape.

REFERENCE SIGNS LIST

1 Flowmeter
13 Orifice passage
16 Sensor passage
30 Distribution orifice
31a Through hole
35a Through hole
C Passage diameter
L Length in a pipe axis direction

The invention claimed is:

1. A flowmeter comprising a sensor passage disposed with a sensor for measuring a flow rate and a bypass passage placed with respect to the sensor passage, wherein
the flowmeter includes a distribution orifice provided on an inlet side of the sensor passage and a main orifice provided in the bypass passage, and
in a graph including a vertical axis indicating an effective sectional area and a lateral axis indicating a fluid pressure of a fluid, a changing trend in the effective sectional area of the main orifice and a changing trend in the effective sectional area of the distribution orifice are similar.

2. The flowmeter according to claim 1, wherein
in the graph including the vertical axis indicating the effective sectional area and the lateral axis indicating the fluid pressure of the fluid, the effective sectional area of the distribution orifice decreases to the left in a region where the fluid pressure is negative, and
in the graph including the vertical axis indicating the effective sectional area and the lateral axis indicating the fluid pressure of the fluid, the effective sectional area of the main orifice decreases to the left in the region where the fluid pressure is negative.

3. The flowmeter according to claim 1, wherein
the main orifice in a nozzle-like shape has a length in a pipe-axis direction twice or more as long as a passage diameter in a direction orthogonal to a pipe axis, and
the distribution orifice has a plurality of through holes.

4. The flowmeter according to claim 1, wherein the effective sectional area is calculated by a formula of a subsonic region.

5. The flowmeter according to claim 1, wherein
the main orifice has a small-diameter part having a length of 9 mm or more, and
the distribution orifice is formed with any ones of nine holes each having a diameter of 0.2 mm when a fluid flows at a small flow rate and seven holes each having a diameter of 0.15 mm when the fluid flows at a large flow rate.

6. The flowmeter according to claim 2, wherein
the main orifice in a nozzle-like shape has a length in a pipe-axis direction twice or more as long as a passage diameter in a direction orthogonal to a pipe axis, and
the distribution orifice has a plurality of through holes.

7. The flowmeter according to claim 2, wherein the effective sectional area is calculated by a formula of a subsonic region.

8. The flowmeter according to claim 3, wherein the effective sectional area is calculated by a formula of a subsonic region.

9. The flowmeter according to claim 6, wherein the effective sectional area is calculated by a formula of a subsonic region.

10. The flowmeter according to claim 2, wherein
the main orifice has a small-diameter part having a length of 9 mm or more, and
the distribution orifice is formed with any ones of nine holes each having a diameter of 0.2 mm when a fluid flows at a small flow rate and seven holes each having a diameter of 0.15 mm when the fluid flows at a large flow rate.

11. The flowmeter according to claim 3, wherein
the main orifice has a small-diameter part having a length of 9 mm or more, and
the distribution orifice is formed with any ones of nine holes each having a diameter of 0.2 mm when a fluid flows at a small flow rate and seven holes each having a diameter of 0.15 mm when the fluid flows at a large flow rate.

12. The flowmeter according to claim 4, wherein
the main orifice has a small-diameter part having a length of 9 mm or more, and
the distribution orifice is formed with any ones of nine holes each having a diameter of 0.2 mm when a fluid flows at a small flow rate and seven holes each having a diameter of 0.15 mm when the fluid flows at a large flow rate.

13. The flowmeter according to claim 6, wherein
the main orifice has a small-diameter part having a length of 9 mm or more, and
the distribution orifice is formed with any ones of nine holes each having a diameter of 0.2 mm when a fluid flows at a small flow rate and seven holes each having a diameter of 0.15 mm when the fluid flows at a large flow rate.

14. The flowmeter according to claim 7, wherein
the main orifice has a small-diameter part having a length of 9 mm or more, and
the distribution orifice is formed with any ones of nine holes each having a diameter of 0.2 mm when a fluid flows at a small flow rate and seven holes each having a diameter of 0.15 mm when the fluid flows at a large flow rate.

15. The flowmeter according to claim 8, wherein
the main orifice has a small-diameter part having a length of 9 mm or more, and
the distribution orifice is formed with any ones of nine holes each having a diameter of 0.2 mm when a fluid flows at a small flow rate and seven holes each having a diameter of 0.15 mm when the fluid flows at a large flow rate.

16. The flowmeter according to claim 9, wherein
the main orifice has a small-diameter part having a length of 9 mm or more, and
the distribution orifice is formed with any ones of nine holes each having a diameter of 0.2 mm when a fluid flows at a small flow rate and seven holes each having a diameter of 0.15 mm when the fluid flows at a large flow rate.

* * * * *